(12) United States Patent
Muvundamina et al.

(10) Patent No.: US 9,481,814 B2
(45) Date of Patent: Nov. 1, 2016

(54) TACKY, HEAT CURABLE MULTI-LAYER ADHESIVE FILMS

(71) Applicant: H.B. Fuller Company, St. Paul, MN (US)

(72) Inventors: Mutombo J. Muvundamina, Minneapolis, MN (US); Rituparna Paul, St. Paul, MN (US); Felix D. Mai, Ludwigshafen (DE); Brian W. Carlson, Woodbury, MN (US)

( * ) Notice: Subject to any disclaimer, the term of this patent is extended or adjusted under 35 U.S.C. 154(b) by 0 days.

(21) Appl. No.: 14/632,779

(22) Filed: Feb. 26, 2015

(65) Prior Publication Data

US 2015/0240128 A1   Aug. 27, 2015

Related U.S. Application Data

(60) Provisional application No. 61/944,861, filed on Feb. 26, 2014.

(51) Int. Cl.
| | | |
|---|---|---|
| *C09J 7/00* | (2006.01) | |
| *B32B 37/18* | (2006.01) | |
| *B32B 37/12* | (2006.01) | |
| *B32B 37/06* | (2006.01) | |

(52) U.S. Cl.
CPC ............... *C09J 7/00* (2013.01); *B32B 37/06* (2013.01); *B32B 37/1284* (2013.01); *B32B 37/18* (2013.01); *B32B 37/1207* (2013.01); *B32B 2037/1253* (2013.01); *C09J 2201/28* (2013.01); *C09J 2201/36* (2013.01); *C09J 2201/606* (2013.01); *C09J 2433/00* (2013.01); *C09J 2475/00* (2013.01); *Y10T 428/24843* (2015.01); *Y10T 428/269* (2015.01); *Y10T 428/2826* (2015.01); *Y10T 428/31551* (2015.04); *Y10T 428/31591* (2015.04); *Y10T 428/31601* (2015.04); *Y10T 428/31605* (2015.04); *Y10T 442/2098* (2015.04)

(58) Field of Classification Search
CPC .......... B32B 37/06; Y10T 428/24843; Y10T 428/31551; Y10T 428/31605
See application file for complete search history.

(56) References Cited

U.S. PATENT DOCUMENTS

| | | | |
|---|---|---|---|
| 6,593,435 B2 | 7/2003 | Abend | |
| 7,935,383 B2 | 5/2011 | Zollner et al. | |
| 2003/0157337 A1 | 8/2003 | Abend | |
| 2007/0029309 A1 | 2/2007 | Keite-Telgenbuscher et al. | |
| 2007/0137775 A1* | 6/2007 | Bargmann | C09J 7/00 156/244.11 |
| 2008/0171208 A1* | 7/2008 | Buchner | C08G 18/222 428/423.1 |
| 2009/0068431 A1 | 3/2009 | Hoenigmann | |
| 2010/0021683 A1 | 1/2010 | Junghans et al. | |
| 2011/0048632 A1 | 3/2011 | Mitchell | |
| 2011/0165402 A1 | 7/2011 | Zollner et al. | |
| 2011/0244229 A1 | 10/2011 | Ishiguro et al. | |
| 2012/0237764 A1 | 9/2012 | Soejima et al. | |

* cited by examiner

*Primary Examiner* — Betelhem Shewareged
(74) *Attorney, Agent, or Firm* — Kirsten Stone; Kristi Halloran; Ben Sur

(57) ABSTRACT

Disclosed is a multi-layer adhesive film including a heat curable adhesive film and a first tacky adhesive composition disposed on the first major surface of the heat curable adhesive film. The heat curable adhesive film includes a surface-deactivated solid isocyanate and a polyurethane that includes functional groups that are reactive with isocyanate. A method of making an article that includes the multi-layer adhesive film and article made thereby are also disclosed.

20 Claims, 3 Drawing Sheets

Fig 1

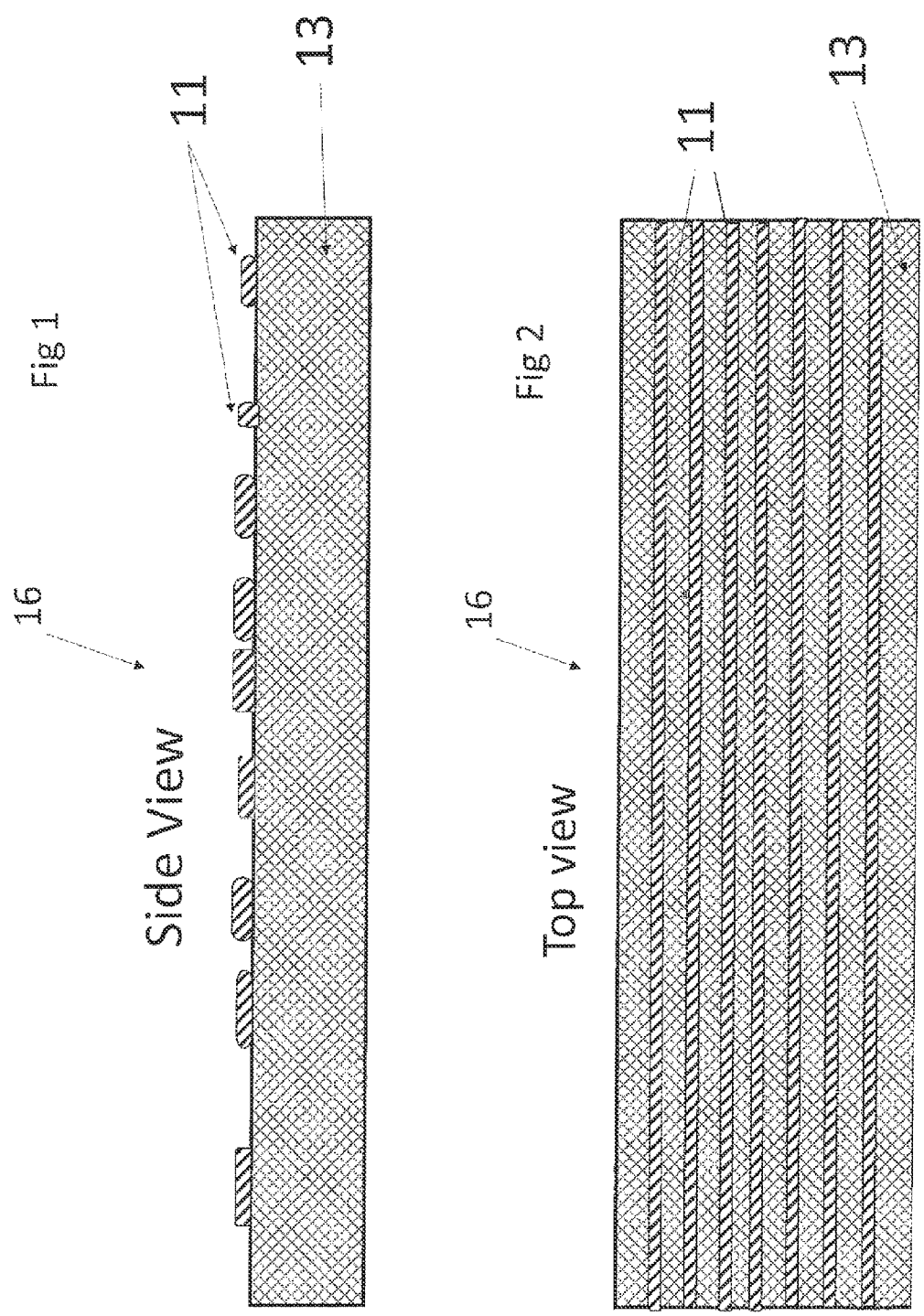

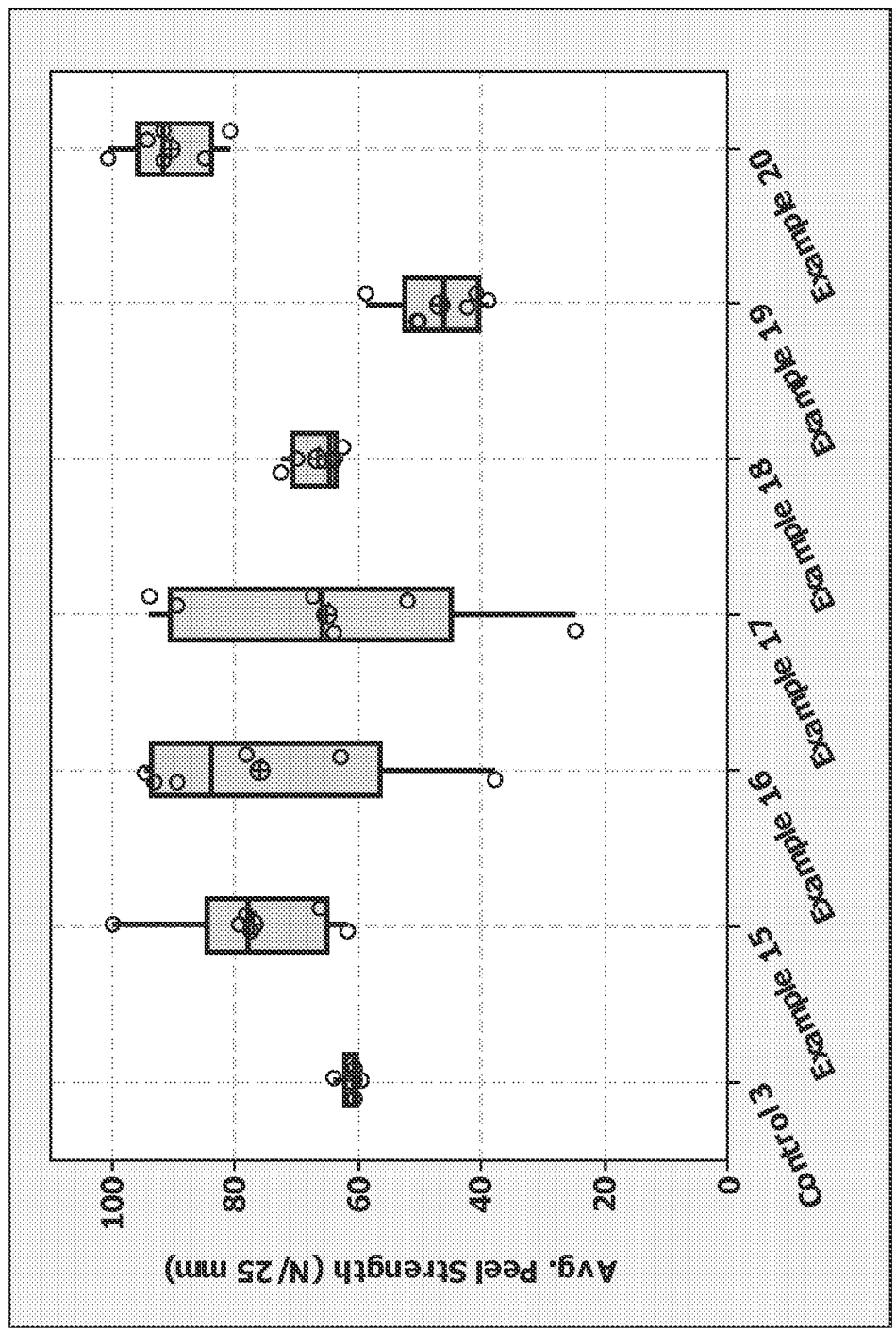

TACKY, HEAT CURABLE MULTI-LAYER ADHESIVE FILMS

This patent application claims the benefit of or priority to U.S. provisional application No. 61/944,861 filed on Feb. 26, 2014.

BACKGROUND OF THE INVENTION

The invention relates to multi-layer adhesive films that temporarily and/or permanently maintain a substrate in a fixed position relative to the adhesive films. In particular, the multi-layer adhesive films include a heat curable adhesive film and an adhesive composition that has tack at room temperature.

SUMMARY OF THE INVENTION

In one aspect, the invention features a multi-layer adhesive film that includes a heat curable adhesive film having a first major surface and a second major surface opposite the first major surface, and a first tacky adhesive composition disposed on the first major surface of the heat curable adhesive film. The heat curable adhesive film includes a surface-deactivated solid isocyanate and a polyurethane reactive with isocyanate functionality.

In one embodiment, the multi-layer adhesive film further includes a second tacky adhesive composition disposed on the second major surface of the heat curable adhesive film.

In another aspect, the invention features a method of making an article having a first substrate using any one of the aforesaid multi-layer adhesive films. The method includes contacting the first substrate with the first tacky adhesive composition of the multi-layer adhesive film, and heating the multi-layer adhesive film to a temperature sufficient to activate the cure of the multi-layer adhesive film.

In yet another aspect, the invention features a method of making an article having a first substrate and a second substrate using any one of the aforesaid multi-layer adhesive films. The method includes contacting the first substrate with the first tacky adhesive composition of the multi-layer adhesive film, heating the multi-layer adhesive film to a first temperature sufficient to render the heat curable adhesive film of the multi-layer adhesive film tacky, and contacting a second substrate with the heat curable adhesive film of the multi-layer adhesive film.

In one embodiment, the method further includes heating the multi-layer adhesive film to a second temperature sufficient to activate the cure of the heat curable adhesive film of the multi-layer adhesive film.

In yet another aspect, the invention features an article including any one of the aforesaid multi-layer adhesive films, and a first substrate in direct contact with the tacky adhesive composition of the multi-layer adhesive film.

In one embodiment, the article further includes a second substrate, which is in direct contact with the heat curable adhesive film of the multi-layer adhesive film.

In yet another aspect, the invention features an article including a first substrate; a second substrate; and any one of the aforesaid multi-layer adhesive films. The first substrate is bonded to the multi-layer adhesive film through the first tacky adhesive composition, and the second substrate is bonded to the multi-layer adhesive film through a second tacky adhesive composition, which is disposed on the second major surface of the heat curable adhesive film of the multi-layer adhesive film.

The invention features a curable multi-layer adhesive film useful for forming a bond to a single substrate or for bonding at least two substrates to each other through the multi-layer adhesive film.

The multi-layer adhesive film can be used to maintain a first substrate in a fixed position relative to the multi-layer adhesive film through the first tacky adhesive without the addition of heat, and, optionally, can be used to maintain a second substrate in a fixed position relative to the multi-layer film.

The multi-layer film can also be used to reduce or prevent movement of two substrates relative to one another during assembly, shipment, and combinations thereof.

GLOSSARY

The term "self-supporting adhesive film" means an adhesive film that maintains its integrity in the absence of any substrate.

The term "polyurethane" means polyurethane as well as polyurethane that contains urea groups in the backbone of the polyurethane.

The term "aqueous dispersion" means an aqueous dispersion, aqueous emulsion, aqueous suspension, and aqueous solution.

The term "permanent adhesive bond" means an adhesive bond that either cannot be altered or exhibits damage to either the adhesive or a substrate bonded to the adhesive when an attempt is made to alter the bond.

Other features and advantages will be apparent from the following description of the drawings, the preferred embodiments, and from the claims. In the figures, like numbers are used to represent like elements.

BRIEF DESCRIPTION OF DRAWINGS

FIG. 1 shows the side view of a multi-layer adhesive film of the invention in one embodiment.

FIG. 2 shows the top view of a multi-layer adhesive film of the invention in another embodiment.

FIG. 6 illustrates the cured 180 degree peel strength of Control 3 and Examples 15-20 in a plot format.

DETAILED DESCRIPTION

Figure 3:
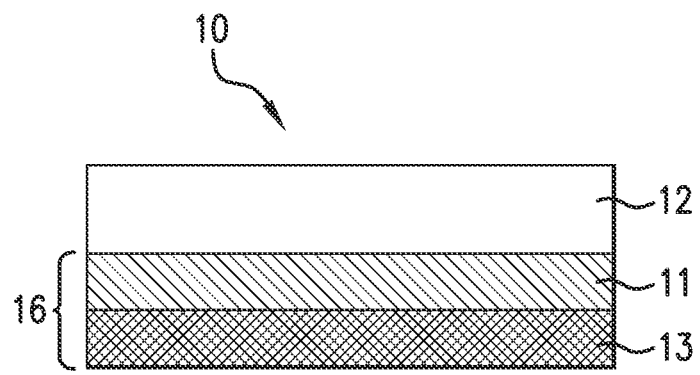
FIG. 3 shows one embodiment of an article of the invention.

The multi-layer adhesive film includes a heat curable adhesive film, a first tacky adhesive composition disposed on a first major surface of the heat curable adhesive film, optionally, a second tacky adhesive composition disposed on a second major surface of the heat curable adhesive film, and optionally at least one release liner disposed on the first tacky adhesive composition, the optional second tacky adhesive composition, or a combination thereof.

The layer of the tacky adhesive of the multi-layer adhesive film can be used to maintain a first substrate in a fixed position. Preferably the layer of the tacky adhesive of the multi-layer adhesive film can be used to form a tacky adhesive bond to a first substrate. The heat curable adhesive film, when heated, can be used to form a bond to a second substrate. The bonds formed by the multi-layer adhesive film can be uncured or cured.

The multi-layer adhesive film can be heated to a temperature e.g., at least 60° C., at least 75° C., from about 60° C. to about 150° C., or from about 75° C. to about 100° C. to activate the cure of the heat curable adhesive film, and optionally form a cured bond with the second substrate.

Alternatively, the multi-layer adhesive film can be subsequently heated to a first temperature (i.e., a temperature greater than room temperature) such that the heat curable adhesive film exhibits tack, and then, subsequently heated to a second temperature to activate the cure of the heat curable adhesive film cures.

The first temperature is at least 30° C., at least 40° C., preferably from about 30° C. to about 60° C., or from about 40° C. to about 50° C.

The second temperature is higher than the first temperature and is sufficient to activate the cure of the heat curable adhesive film. The second temperature preferably is at least 20° C. greater than the first temperature. The second temperature preferably is from about 60° C. to about 150° C., or from about 75° C. to about 100° C.

The multi-layer adhesive film is storage stable and remains heat curable when stored at room temperature (i.e., from about 22° C. to about 25° C.).

The multi-layer adhesive film exhibits a cured 180° peel strength of at least about 10 Newtons per 25 millimeter (N/25 mm), at least about 20 N/25 mm, or even at least about 40 N/25 mm, and a cured 180° peel strength that is at least 25%, at least 50%, at least 75%, or even at least 100% of the cured 180° peel strength exhibited by the heat curable adhesive film in the absence of a tacky adhesive composition.

The multi-layer adhesive film can have any suitable thickness including, e.g., at least 10 microns (μm), at least 25 μm, at least 50 μm, from about 25 μm to about 200 μm, or from about 50 μm to about 150 μm.

Heat Curable Adhesive Film

The heat curable adhesive film includes a surface-deactivated solid polyisocyanate, and a polyurethane that includes functional groups that are capable of reacting with isocyanate groups (which is also referred to herein as "polyurethane reactive with isocyanate functionality"). The heat curable adhesive film can be formulated to be a self-supporting, heat curable adhesive film. The heat curable adhesive film can include a single layer of heat curable adhesive film or multiple layers of heat curable adhesive film. A heat curable adhesive film that includes multiple layers of heat curable adhesive film can be formed using a variety of techniques including, e.g., direct coating one layer on top of the other, passing a dried heat curable adhesive film through a coater multiple times (e.g., an additional aqueous composition that includes polyurethane reactive with isocyanate functionality and surface-deactivated solid polyisocyanate is coated on a dried heat curable adhesive film, and the additional aqueous composition is then dried (the process can be repeated multiple times)), by laminating two heat curable adhesive films together, and combinations thereof. The multiple layers of heat curable adhesive film can be derived from the same or different aqueous compositions.

The dried heat curable adhesive film can have any suitable thickness including, e.g., a thickness of at least 10 microns (μm), at least 25 μm, at least 50 μm, from about 10 μm to about 200 μm, from about 25 μm to about 200 μm, or from about 50 μm to about 150 μm.

The heat curable adhesive film is derived from an aqueous composition that includes a polyurethane that includes functional groups that are capable of reacting with isocyanate groups and a surface-deactivated solid polyisocyanate. The polyurethane and the surface-deactivated solid polyisocyanate can be supplied separately as a two part system, and then blended prior to the formation of the film. Alternately, the polyurethane and the surface-deactivated solid polyisocyanate can be supplied as a one part system that includes a blend of the polyurethane and the surface-deactivated solid isocyanate.

A variety of methods can be used to prepare the heat curable adhesive film including, e.g., depositing the aqueous composition onto a release liner, and drying the aqueous composition at a temperature below the temperature at which the activation of the cure between the polyurethane and the surface-deactivated solid isocyanate occurs (i.e., the temperature at which crosslinking reaction takes place between the functional groups on the polyurethane and the isocyanate groups of the surface-deactivated solid isocyanate) to form an essentially dry, and self-supporting heat curable adhesive film. The resulting heat curable adhesive film is storage-stable at room temperature and capable of curing (i.e., crosslinking) at a temperature above room temperature.

The heat curable adhesive film can be formed using a variety of application techniques including, e.g., spraying (e.g. spiral and splatter spraying), coating (e.g. roll, slot, gravure, and pattern), and combinations thereof. One useful application method includes roll coating the aqueous composition at a desirable coat weight onto a release liner, and then passing the coated aqueous composition through a drying tunnel to form the dried, heat curable adhesive film. The drying temperature in the tunnel can be any suitable temperature or series of temperatures, but preferably is maintained at a temperature that is sufficiently low to prevent the surface-deactivated solid isocyanate from activating (i.e., crosslinking). During drying the heat curable adhesive film preferably is maintained at a temperature of no greater than about 70° C., no greater than about 60° C., or even no greater than about 55° C. The heat curable adhesive film optionally can be chilled (e.g. by passing the film over a chilled roller). The heat curable adhesive film disposed on the release liner can be wound as a roll, and stored for a later date to be used.

Polyurethane Reactive to Isocyanate Functionality

The heat curable adhesive film includes at least 30% by weight, at least 50% by weight, at least 70% by weight, at least 80% by weight, from about 30% by weight to about 97% by weight, from about 50% by weight to about 95% by weight, from about 70% by weight to about 95% by weight, or from about 80% by weight to about 95% by weight polyurethane reactive with isocyanate functionality, based on the weight of the dried heat curable film.

The polyurethane is film-forming and can be a single type of polyurethane or a blend of at least two different polyurethanes. The polyurethane includes functional groups that are capable of reacting with isocyanate functional groups. Useful isocyanate functional groups include e.g., hydroxyl, amino, carboxyl, carbon amide, and mercaptan, and combinations thereof.

The polyurethane preferably has a degree of crystallinity and a peak melting temperature that is sufficiently high to allow transportation and storage of the heat curable adhesive film and also sufficiently low to allow heat activation of the heat curable adhesive film (i.e., crosslinking). One useful measure of crystallinity is enthalpy of fusion. The enthalpy of fusion and the peak melting temperature of a polyurethane is measured using a dried film of the polyurethane. Useful polyurethanes, when in the form of a dried film, exhibit an enthalpy of fusion of at least 15 Joules per gram (J/g), at least 25 J/g, from about 15 J/g to about 70 J/g, from about 25 J/g to about 70 J/g, or from about 35 J/g to about 70 J/g. Useful polyurethanes, when in the form of a dried film form, also preferably exhibit a peak melting temperature of at least 30° C., at least 40° C., from about 30° C. to about 80° C., or from about 40° C. to about 60° C.

The polyurethane preferably has a relatively low weight average molecular weight (Mw). Preferably the polyurethane has a weight average molecular weight of no greater than 120,000 gram/mole (g/mole), no greater than 100,000 g/mole, no greater than 90,000 g/mole, or no greater than 80,000 g/mole.

Suitable polyurethanes are derived from a polyol and a polyisocyanate. Examples of useful polyols include polyester polyols, polyether polyols, and combinations thereof. Useful polyester polyols include, e.g., crystalline polyester polyols and amorphous polyester polyols.

Suitable polyester polyols include, e.g., polyester polyols derived from linear dicarboxylic acids, derivatives of dicarboxylic acids (e.g., anhydrides, esters and acid chlorides), aliphatic polyols, cyclo aliphatic polyols, linear polyols, branched polyols, and combinations thereof. Examples of useful dicarboxylic acids from which the polyester polyol can be derived include adipic acid, succinic acid, sebacic acid, dodecanedioic diacid, and combinations thereof. Examples of useful aliphatic diols from which the polyester polyol can be derived include ethylene glycol, 1,3-propanediol, 1,4-butanediol, 1,5-pentanediol, 1,6-hexanediol, neopentyl glycol, and combinations thereof. Useful polyester polyols include, e.g., polyester polyols derived from 1,4-butanediol, 1,6-hexanediol, and combinations thereof including, e.g., polyester polyols derived from adipic acid and 1,4-butanediol, adipic acid and 1,6-hexanediol, adipic acid, 1,6-hexanediol, and neopentyl glycol, and combinations thereof.

Suitable polyether polyols include the products obtained from the polymerization of a cyclic oxide, e.g., ethylene oxide, propylene oxide, butylene oxide, and tetrahydrofuran, or by the addition of one or more such oxides to polyfunctional initiators having at least two active hydrogens, e.g., water, polyhydric alcohols (e.g., ethylene glycol, propylene glycol, diethylene glycol, cyclohexane dimethanol, glycerol, trimethylol-propane, pentaerythritol and bisphenol A), ethylenediamine, propylenediamine, triethanolamine, and 1,2-propanedithiol. Particularly useful polyether polyols include, e.g., polyoxypropylene diols and triols, poly(oxyethylene-oxypropylene)diols and triols obtained by the simultaneous or sequential addition of ethylene oxide and propylene oxide to appropriate initiators and polytetramethylene ether glycols obtained by the polymerization of tetrahydrofuran.

Useful polyisocyanates have at least two free isocyanate groups in each molecule and include, e.g., diiosocyantes, triisocyanates, higher order polyisocyanates, and combinations thereof). Examples of useful polyisocyanates include e.g., aliphatic isocyanates (e.g. hexamethylene diisocyanate (HDI)), tetramethylxylylene diisocyanate (TMXDI)), cycloaliphatic isocyanates (e.g., 1-isocyanto-3,3,5-trimethyl-5-isocyanatomethyl-cyclohexane (IPDI), hydrogenated methylene diphenyl diisocyanate ($H_{12}$MDI)), heterocyclic isocyanates, and aromatic isocyanates (e.g. methylene diphenyl diisocyanate (MDI), toluene diisocyanate (TDI)), napthalene-1,5-diisocyanate (NDI), 3,3'-dimethyl-biphenyl-4,4'-diisocyanate (TODI), dimeric MDI, the uretdione of MDI (MDIU), the uretdione of TDI (TDIU), 3,3'-diisocyanate-4,4'-dimethyl-N,N'-diphenyl urea (TDIH), addition product of 2 moles of 1-methyl-2,4-phenylene-diisocyanate with 1 mole of 1,2-ethandiol or 1,4-butandiol; addition product of 2 moles of MDI to 1 mole of diethylene glycol; and the combinations thereof.

The polyurethane can be in the form of an aqueous polyurethane dispersions, preferably anionic polyurethane dispersions. Examples of useful commercially available polyurethane dispersions include DISPERCOLL U53, DISPERCOLL U56, DISPERCOLL U XP 2682, DISPERCOLL U 8755, DISPERCOLL U 2824 XP, DISPERCOLL U 2815 XP, DISPERCOLL U54, DISPERCOLL U XP 2710, DISPERCOLL U 2849 XP, DISPERCOLL U42 AND DISPERCOLL U XP 2643, all of which are available from Bayer Material Science AG (Germany); WD4047, which is available from HB Fuller Company (St. Paul, Minn.); and LUPHEN 585, LUPHEN 3615, LUPHEN D 207 E and LUPHEN D DS 3548, all of which are available from BASF.

The aqueous composition preferably includes at least 15% by weight, at least 25% by weight, from about 15% by weight to about 60% by weight, from about 25% by weight to about 60% by weight, from about 40% by weight to about 60% by weight, or even from about 40% by weight to about 50% by weight polyurethane, based on the weight of the aqueous composition.

Surface-Deactivated Solid Isocyanate

The heat curable adhesive film preferably includes at least 1% by weight, at least 2% by weight, at least 4% by weight, from about 4% by weight to about 25% by weight, from about 4% by weight to about 20% by weight, or even from about 4% by weight to about 10% by weight surface-deactivated solid isocyanate, based on the weight of the dried heat curable adhesive film.

The surface-deactivated solid isocyanate is in the form of a solid particulate and functions as a crosslinking agent. Useful surface-deactivated solid isocyanate can be derived from a polyisocyanate and a deactiving agent.

A variety of polyisocyanates are suitable including, e.g., aliphatic, cycloaliphatic, heterocyclic, and aromatic isocyanates. Specific examples of useful polyisocyanates include dimeric 4,4'-MDI, the uretdione of MDI (MDIU), the uretdione of TDI (TDIU), 3,3'-diisocyanate-4,4'-dimethyl-N,N'-diphenyl urea (TDIH), the addition product of 2 moles of 1-methyl-2,4-phenylene-diisocyanate and 1 mole of 1,2-ethandiol or 1,4-butandiol, the addition product of 2 moles of MDI and 1 mole of diethylene glycol, the isocyanurate of isophoron diisocyanate (IPDI-T), and combinations thereof.

Commercially available solid isocyanates that can be surface-deactivated include the uretdione of TDI (e.g., ADOLINK TT available from Rhein Chemie Rheinau GmBH (Mannheim, Germany), DANCURE 999 available from Danquinsa GmBH (Germany), THANECURE T9 (TSE, Clearwater, Fla.)); DESMODUR LP BUEJ 471, which is a micronized IPDI-isocyanurate available from Bayer Material Science AG (Germany); and the uretdione of MDI (GRILBOND A2BOND available from EMS-Griltech (Switzerland)).

The surface-deactivated solid isocyanate preferably is deactivated by the presence of a deactivating agent. Useful deactivating agents include, e.g., primary aliphatic amines, secondary aliphatic amines, diamines, polyamines, hydrazine derivatives, amidines, guanidines, and combinations thereof. Examples of useful deactivating agents include ethylene diamine, 1,3-propylene-diamine, diethylene triamine, triethylene tetramine, 2,5-dimethyl-piperazine, 3,3'-dimethyl-4,4'-diamino-dicyloheyl methane, methyl nonanediamine, isophoron diamine, 4,4'-diaminodicyclohexyl methane, diamino polypropylene ether, triamino polypropylene ether, polyamido amine, the deactivating agents disclosed in U.S. Pat. No. 6,348,548 B1, and combinations thereof.

The surface-deactivated solid isocyanates can be prepared according to a variety of methods including, e.g., the processes described in U.S. Pat. No. 6,348,548 B1, which is incorporated herein by its entirety.

The surface-deactivated solid isocyanate can be in a variety of forms including, e.g., aqueous suspensions, micronized particles, and combinations thereof.

Useful commercially available surface-deactivated solid isocyanates include, e.g., DISPERCOLL BL XP 2514 (an aqueous suspension of surface-deactivated isocyanate containing approximately 40% of the uretdione of TDI) available from Bayer Material Science AG (Germany)).

The surface-deactivated solid isocyanate can be blended with the polyurethane dispersion to form a stable aqueous composition.

The aqueous composition preferably includes at least 0.25% by weight, at least 0.5% by weight, at least 1% by weight, from about 0.25% by weight to about 10% by weight, from about 0.5% by weight to about 8% by weight, or even from about 1% by weight to about 5% by weight surface-deactivated isocyanate, based on the weight of the aqueous composition.

Additional Components

The heat curable film and the aqueous composition optionally include a variety of other additives including, e.g., other polymers, catalysts (e.g. amine based), preservatives, pH modifiers (e.g. aqueous ammonia), adhesion promoters (e.g. tackifiers, silane containing compounds), color agents, surfactants, defoaming agents, fungicides, bactericides, thickening agents, blocking agents and stabilizers (e.g. amines), fillers (e.g. carbonates, talc, starch), materials that help the adhesive film to form a barrier (e.g. nano clay), insulative materials (e.g. mineral fillers, glass microbubbles), electric conductive materials (e.g. various metals (e.g. silver)), and combinations thereof.

Other suitable polymers (which are referred to as second polymer) that can be included in the aqueous composition include, e.g., polyurethanes that are not reactive with isocyanate functionality; vinyl acetate ethylene copolymers (VAE); polyvinyl alcohol (PVA); polyacrylates that are not reactive with isocyanate functionality; acrylonitriles (e.g., butadiene acrylonitrile); styrene butadiene rubber (SBR); and combinations thereof.

When a second polymer is present in the heat curable adhesive film, the sum of the polyurethane reactive with isocyanate functionality, the surface-deactivated solid isocyanate, and the second polymer amounts to at least 90% by weight, at least 95% by weight, or even at least 98% of the weight of the dried, heat curable adhesive film.

One example of a useful stabilizer is JEFFAMINE T-403 POLYETHERAMINE commercially available from Huntsman Corporation (The Woodlands, Tex.).

Useful thickeners include, e.g., BORCHI®GEL A LA available from OMG Borchers GmbH (Langenfeld, Germany) and STEROCOLL HT commercially available from BASF Chemical Company (Ludwigshafen, Germany).

On example of a useful preservative is ACTICIDE MBS commercially available from Thor GmbH (Speyer, Germany).

Tacky Adhesive Composition

Tacky adhesive composition refers to an adhesive composition that has tack at room temperature (i.e., from about 22° C. to about 25° C.)

The multi-layer adhesive film includes a first tacky adhesive composition disposed on the first major surface of the heat curable adhesive film (e.g., the multi-layer adhesive film is in the form of a one-sided multi-layer adhesive film), and optionally includes a second tacky adhesive composition disposed on the second major surface of the heat curable adhesive film (e.g., the multi-layer adhesive film is in the form of a double-sided multi-layer adhesive film).

When a first tacky adhesive composition is present on a first major surface of the multi-layer adhesive film, the multi-layer adhesive film exhibits a loop tack of at least 10 gf, from about 5 grams force (gf) to about 500 gf, from about 10 gf to about 400 gf, or from about 20 gf to about 350 gf at room temperature. When a second tacky adhesive composition is present on a second major surface of the multi-layer adhesive film, the second major surface preferably exhibits the same or similar loop tack as that with the first tacky adhesive at room temperature.

The first and the second tacky adhesive compositions can be the same or different tacky adhesive compositions. The first and the second tacky adhesive compositions can be any suitable adhesive compositions that have tack at room temperature, which include pressure-sensitive adhesives. Classes of suitable tacky adhesive compositions include, e.g., water-based, solvent-based, solvent-free, hot melt, reactive (e.g., moisture curable, radiation curable), and combinations thereof. Examples of suitable tacky adhesive compositions in terms of the base polymer contained in the adhesives include e.g., rubber-based, polyacrylate-based, polyacrylonitrile-based, vinyl alkyl ether-based, polyvinylchloride based, polyurethane-based, block copolymer based (e.g. styrene block copolymer), and the like. Such tacky adhesives can be used alone or in combination of two or more.

Examples of useful commercially available tacky adhesive compositions include water based acrylate-based dispersions e.g., PD2056F, PD2656 and ACRYLTAC SP405, water based polyurethane dispersions e.g., WD4051 and WD 4007, and moisture curable polyurethane e.g., NP6231, all of which are available from H.B. Fuller Company (St. Paul, Minn.); ADHESIVE 2141, a water-based pressure sensitive adhesive dispersion made of acrylic and acrylonitrile monomers (distributed by Neschen AG, Bückeburg, Germany), ACRONAL pressure-sensitive adhesives including e.g., ACRONAL N-CR3010 (acrylic polymers available from BASF, Florham Park, N.J.); ROBOND pressure-sensitive adhesives including e.g., ROBOND PS 7165 and ROBOND PS-9908 (The Dow Chemical Company, Midland, Mich.); NACOR pressure-sensitive adhesives (e.g., emulsion compositions based on acrylic monomers and vinyl acetate) (Henkel Corporation, Düsseldorf, Germany); and AROSET emulsion pressure-sensitive adhesives (Ashland Inc, Covington, Ky.).

The tacky adhesive composition can be applied to a major surface of the heat curable adhesive film using any suitable method including, e.g., spraying, roll-to-roll, laminating, dip coating, slot coating, gravure coating, knife coating, contact coating, flexographic coating, screen printing, and combinations thereof. The tacky adhesive composition preferably is coated on the heat curable adhesive film at a coat weight of at least 2 grams per square meter ($g/m^2$), no greater than 15 $g/m^2$, from about 2 $g/m^2$ to about 25 $g/m^2$, from about 2 $g/m^2$ to about 15 $g/m^2$, from about 2 $g/m^2$ to about 12 $g/m^2$ or from about 4 $g/m^2$ to about 8 $g/m^2$.

The tacky adhesive composition preferably is applied, if necessary dried, on the heat curable adhesive film at a temperature that is less than the cure temperature of the heat curable adhesive film. The hot melt tacky adhesives are applied in a manner such that the heat exposure of the heat curable film is minimized.

The tacky adhesive can be applied as a continuous or a discontinuous coating on the heat curable adhesive film. When coated as a discontinuous coating, the tacky adhesive can be applied in a variety of forms including, e.g., random, pattern, dots, stripes, spiral, dashes, or combinations thereof.

Uses

The multi-layer adhesive film is useful in a variety of applications including, e.g., temporarily bonding at least one substrate, permanently bonding at least one substrate, protecting a substrate, inhibiting or preventing the movement of a first substrate relative to a second substrate, and combinations thereof. The multi-layer adhesive film is also useful in a variety of processes including, e.g., manufacturing processes (e.g., bonding two parts of an article together and maintaining two parts in fixed relation to one another during the manufacturing process), shipping processes, stacking processes, and combinations thereof.

The multi-layer adhesive film can be used in the manufacture of a variety of articles including, e.g., shoes, automobile parts, truck bed covers, textile laminations (e.g. outdoor apparel, lingerie), various assembled goods (e.g., panels, laminations, filters, flooring, etc.), and electronics (e.g., metallic parts, plastic parts, glass, glass fiber reinforced plastics inside of an electronic device).

In one embodiment as illustrated by FIG. 1, a one-sided multi-layer adhesive film (16) includes a discontinuous layer of a tacky adhesive composition (11) in the form of beads in direct contact with a first major surface of a heat curable adhesive film (13).

In another embodiment as illustrated by FIG. 2, a one-sided multi-layer adhesive film (16) includes a discontinuous layer of a first tacky adhesive composition (11) in the form of stripes in direct contact with a first major surface of a heat curable adhesive film (13).

In an embodiment shown by FIG. 3, an article (10) includes a multi-layer adhesive film (16) that includes a heat curable adhesive film (13) and a layer of tacky adhesive composition (11) disposed on the heat curable adhesive film (13), and a first substrate (12) disposed on the tacky adhesive composition (11) of the multi-layer adhesive film (16). The first substrate (12) is in direct contact with the tacky adhesive composition (11). In some embodiments, the layer of tacky adhesive composition (11) is discontinuous, and the first substrate (12) is in direct contact with the tacky adhesive composition (11) on the heat curable adhesive film (13). In some embodiments, where the heat curable adhesive film (13) has been cured in situ (i.e., cured while the first substrate was in contact with the layer of tacky adhesive composition (11)), the first substrate is in direct contact and bonded to the heat cured adhesive film (13).

The multi-layer adhesive film can be placed over the top of the first substrate such that the multi-layer adhesive film covers at least one surface of the first substrate. Optionally, a release liner (not shown) is in direct contact with the heat curable adhesive film (13) of the multi-layer adhesive film (16).

Alternatively (not shown), the substrate (12) can be placed in direct contact with the heat curable adhesive film (13) of the multi-layer adhesive film.

In other embodiments, a release liner (not shown) is in direct contact with the first tacky adhesive (11) of the multi-layer adhesive film.

Figure 4:
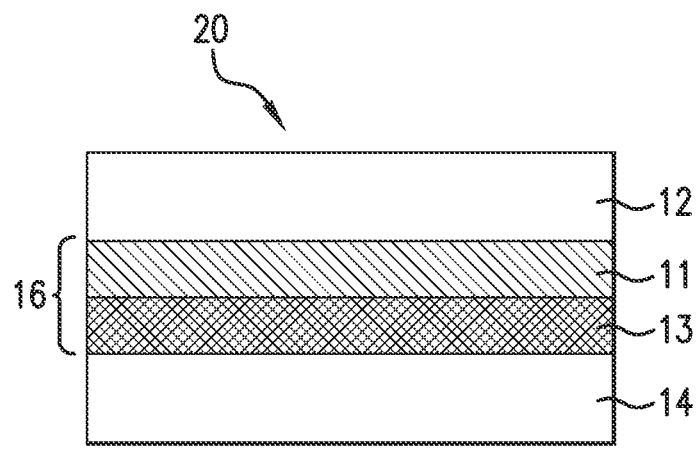
FIG. 4 shows another embodiment of an article of the invention.

In another embodiment as shown in FIG. 4, an article (20) includes a multi-layer adhesive film (16) that includes a heat curable adhesive film (13) and a layer of tacky adhesive composition (11) disposed on a first major surface of the heat curable adhesive film (13), a first substrate (12) disposed on the tacky adhesive composition (11), and a second substrate (14) disposed on a second major surface of the heat curable adhesive film (13) and in direct contact with the heat curable adhesive film (13).

Figure 5:
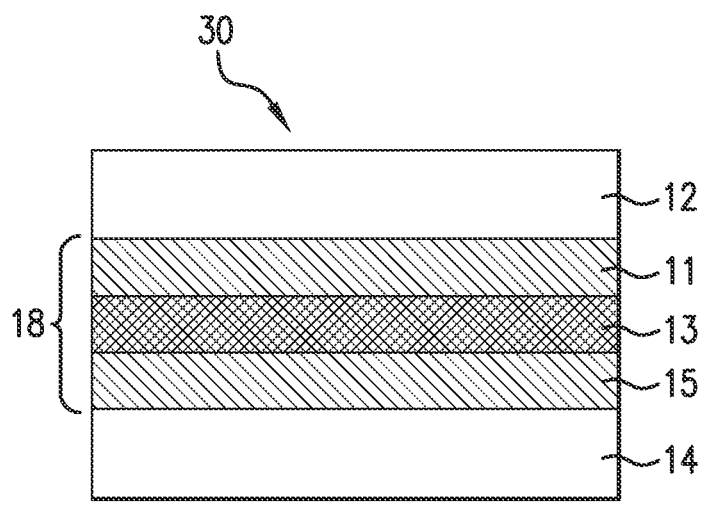
FIG. 5 shows another embodiment of an article of the invention.

In another embodiment as shown in FIG. 5, an article 30 includes a multi-layer adhesive film that is in the form of a double-sided multi-layer adhesive film (18) that includes a first tacky adhesive composition (11) on a first major surface of the heat curable adhesive film (13) and a second tacky adhesive composition (15) on a second major surface of the heat curable adhesive film (13). The article 30 also includes a first substrate (12) in direct contact with the first tacky adhesive composition (11) of the multi-layer adhesive film (18), and a second substrate (14) in direct contact with the second tacky adhesive composition (15) of the multi-layer adhesive film (18).

The first and the second substrates can be of the same or different material. In one embodiment, the first substrate is flexible and the second substrate is rigid. In another embodiment, the first substrate is rigid and the second substrate is flexible. In other embodiments, the first substrate is flexible and the second substrate is flexible. Alternatively, both substrates are rigid.

Useful substrates include rigid substrates and flexible substrates. Examples of suitable rigid substrates include tiles, ceramics, metals (e.g. aluminum, stainless steel), synthetic polymer (e.g., polyamide (e.g. nylon), rayon, polyester, polystyrene, acrylate, polyolefin (e.g., polypropylene, polyethylene, and combinations thereof), ethylene vinyl acetate, polyvinyl chloride, polyurethane, polycarbonate, acrylonitrile-butadiene-styrene, blends of acrylonitrile-butadiene-styrene and polycarbonate, polyether ether ketone, and combinations thereof), composites (e.g. fiber reinforced polymers), glass, cardboard, wood and wood-containing products (e.g., wood composites, composites that include wood pulp and polymer), and combinations thereof. The rigid substrate can be in the form of a single layer or multiple layers.

Useful flexible substrates include, e.g., woven and non-woven webs (e.g., microfiber, canvas), leather, artificial leather, furs, fabrics, films, foils (e.g. decorated foils), papers, and combinations thereof. Flexible substrates can be prepared from a variety of materials including, e.g., cellulose-based materials (e.g., wood pulp, cotton, rayon and viscose), synthetic polymers (e.g., nylon, polyesters, acrylate, polyolefin (e.g., polypropylene, polyethylene, polystyrene, and combinations thereof), ethylene vinyl acetate, polyvinyl chloride, polyurethane, and combinations thereof), and combinations thereof.

The substrate can be pre-treated to improve adhesion of the multi-layer adhesive film to the substrate. Useful pre-treatments include, e.g., corona, plasma, flame, chemical primer, and combinations thereof.

Methods of Making and Using

The multi-layer adhesive film can be adhered to a first substrate either through the tacky adhesive composition or through the heat curable adhesive film.

In one embodiment, the first substrate is contacted with the first tacky adhesive composition of the multi-layer adhesive film so as to affix the first substrate to the multi-layer adhesive film. The tacky adhesive composition assists in maintaining the first substrate in a fixed position relative to the multi-layer adhesive film. The multi-layer adhesive film can then be heated to a temperature that is sufficient to activate the surface-deactivated solid isocyanate within the heat curable adhesive film of the multi-layer adhesive film.

Alternatively, prior to heating the multi-layer adhesive, a second substrate is placed in direct contact with the second major surface of the heat curable adhesive film, then the multi-layer adhesive film is heated to a temperature that is sufficient to activate the surface-deactivated solid isocyanate within the heat curable adhesive film of the multi-layer adhesive film.

In another embodiment, a first substrate is brought into direct contact with the second major surface of the heat curable adhesive film of the multi-layer adhesive film, and a release liner is in direct contact with the first tacky adhesive of the multi-layer adhesive film. The multi-layer adhesive film can then be heated to a temperature that is sufficient to activate the surface-deactivated solid isocyanate within the heat curable adhesive film of the multi-layer adhesive film.

Alternatively, the multi-layer adhesive film can be heated to a first temperature that is sufficient to render the heat curable adhesive film tacky such that the first substrate can be maintained in a fixed position relative to the multi-layer adhesive film to form a laminate. Upon cooling to the room temperature, the laminate can be wound as a roll and stored to a later date to be further heat-activated to cure (i.e. crosslink).

Alternatively, a second substrate can be brought into contact with the first tacky adhesive of the multi-layer adhesive film, and the temperature can be increased to a second temperature that is sufficient to activate the surface-deactivated solid isocyanate to bond the two substrates together through the multi-layer adhesive film.

In another embodiment, an article is prepared by contacting a first substrate with the first tacky adhesive composition of the multi-layer adhesive film, heating the multi-layer adhesive film to a first temperature sufficient to render the heat curable adhesive film of the multi-layer adhesive film tacky, then contacting the tacky surface of the heat curable adhesive film with a second substrate to form a heat curable laminated article. The heat curable laminated article is storage stable such that it can be placed in a storage to a later date, then undergoes a curing process at an end user's place.

Alternatively, the heat curable laminated article can be heated to a second temperature sufficient to activate the surface-deactivated solid isocyanate and begin the curing of the heat curable adhesive film.

Preferably the bond formed between the multi-layer film and the first substrate (and the second substrate, where present) is a destructive bond (i.e., either the substrate or the multi-layer adhesive film (or both) is damaged when an attempt is made to peel the substrate away from the multi-layer adhesive film.

The invention will now be described by way of the following examples. All ratios and percentages are by weight unless otherwise indicated.

EXAMPLES

Test Procedures

Test procedures used in the examples and throughout the specification, unless stated otherwise, include the following.

Molecular Weight

The gel permeation chromatography (GPC) molecular weight distribution curve of each polyurethane sample is obtained using a Waters 2695 Separations Module connected to a Waters 2414 Refractive Index (RI) detector, running 0.05 molar (M) lithium bromide dimethyl formamide (LiBr/DMF) mobile phase through two Agilent Resipore GPC columns. The weight average molecular weight (Mw) data is calculated versus polymethyl methacrylate standards.

Peak Melting Temperature and Enthalpy of Fusion Test Method

The peak melting temperature and enthalpy of fusion ($\Delta H$) of the dried polyurethane dispersions is determined, after removal of the heat history, using a Perkin Elmer, Pyris 1 Differential Scanning Calorimetry (DSC), at a heating rate of 10° C. per minute.

Uncured 180 Degree Peel Strength Test Method

The uncured 180 degree (180°) peel strength is determined, using an Instron tester model 5500R (Instron Corporation, Norwood, Mass.), according to the ASTM D903-98 test method entitled "Standard test method for Peel or Stripping Strength of Adhesive Bonds", with the following exceptions:

1. Test SpeedRate of travel of the power-actuated grip: A speed of 300 mm/min is used for sample testing instead of 305 mm/min.
2. Length of test substrates and bond:
   8 inch (in) (203.2 mm) flexible substrates are used for testing instead of 12 in (304.8 mm) flexible substrates
   4 in (101.6 mm) rigid substrates are used for testing instead of 8 in (203.2 mm) rigid substrates
   A bond length of 3.5 in (88.9 mm) inches is used for testing instead of a bond length of 6 in (152.4 mm); and
3. Samples are conditioned 23° C.+/−1° C. and 50%+/−2% relative humidity for 24 hours.

The mean of the average peel strength for a set of six samples is reported.

Uncured 180 Degree Peel Strength Test Method Sample Preparation Method

This sample preparation method is for use in preparing samples for testing the peel strength associated with the tacky adhesive side of an uncured multi-layer adhesive film that includes a tacky adhesive composition on one major surface thereof and in testing the peel strength associated with an uncured heat curable adhesive film that does not include a tacky adhesive composition on either major surface thereof.

A. Lamination of a Multi-Layer Adhesive Film to a Nylon Backing

A 1 in×8 in (25.4 mm×203.2 mm) piece of multi-layer adhesive is placed onto a 1 in×8 in (25.4 mm×203.2 mm) piece of nylon fabric such that a non-tacky side (i.e., a major surface of the multi-layer adhesive film that does not include a tacky adhesive composition) of the multi-layer adhesive film is in contact with the nylon fabric. The nylon fabric is NYLON SUPPLEX (Invista, Wichita, Kans.), Blue Periwinkle Fabric with a weight of 117.4 g/m², or equivalent. A paper release liner is then placed on the exposed tacky side (i.e., the side of the multi-layer adhesive film that includes a tacky adhesive composition) of the multi-layer adhesive film to form a nylon fabric/multi-layer adhesive film/release liner construction. The construction is then laminated together using a heat sealer set to the following parameters:
   Upper platen temperature: 51.7° C.;
   Lower platen temperature: 51.7° C.;
   Pressure: 21.6 N/cm² (on the laminate); and
   Time: 60 seconds.

An example of a suitable heat sealer is Sentinel Heat Sealer, Model 12ASL/1 commercially available from Sencorp Systems Inc. (Hyannis, Mass.)

The resulting laminate is allowed to cool to room temperature and then stored at 23° C.+/−1° C. and 50%+/−2% relative humidity overnight before further processing.

B. Adhering a Nylon Fabric/Uncured Multi-Layer Adhesive Laminate to a Rigid Polycarbonate Substrate Through the Tacky Side of the Laminate A 1 in×4 in×0.125 in (25.4 mm×101.6 mm×3.2 mm) piece of a rigid polycarbonate (PC) substrate (General Purpose grade Makrolon, from Bayer Material Science, Pittsburgh, Pa.) is wiped down with isopropyl alcohol (IPA) and dried. The release liner of a 1 in×8 in (25.4 mm×203.2 mm) piece of the laminate prepared as set forth in Section A above is removed from the laminate and the now exposed tacky side of the of the multi-layer adhesive film is placed on the PC substrate such that the tacky side contacts the PC substrate. The PC substrate/laminate construction is then passed through a heat sealer set to the following parameters:

Upper platen temperature: 25° C.;
Lower platen temperature: 25° C.;
Pressure: 21.6 N/cm$^2$ (on the sample); and
Time: 60 seconds.

The resulting samples are then stored at 23° C.+/−1° C. and 50%+/−2% relative humidity for a period of approximately 24 hours before being tested according to the uncured 180 Degree Peel Strength Test Method.

Cured 180 Degree Peel Strength Test Method

The Cured 180 Degree Peel Strength Test Method is the same as the Uncured 180 Degree Peel Strength Test Method with the exception that the sample preparation is as follows:

A. Single Sided Multi-Layer Adhesive Film

For a multi-layer film that includes a tacky adhesive composition on only one major exterior surface of the heat curable adhesive film, a 1 in×4 in×0.125 in (25.4 mm×101.6 mm×3.2 mm) piece of rigid polycarbonate (PC) substrate (General Purpose grade Makrolon, from Bayer) is cleaned with isopropyl alcohol (IPA) and dried. A 1 in×3.5 in (25.4 mm×88.9 mm) piece of the multi-layer adhesive film is then placed onto the IPA-cleaned PC substrate such that the tacky side of the multi-layer adhesive film is in contact with the PC substrate. A flexible nylon substrate is then placed on top of the PC substrate/multi-layer adhesive film composite such that the flexible nylon fabric contacts the non-tacky side of the multi-layer adhesive film. The PC/multi-layer adhesive film/nylon fabric layered construction is then bonded together using a heat sealer at a temperature sufficient to activate curing of the heat curable reactive film.

The resulting samples are then stored at 23° C.+/−1° C. and 50%+/−2% relative humidity for approximately 24 hours before being tested according to the Cured 180 Degree Peel Strength Test Method.

To test the multi-layer adhesive films of the examples set forth below, the heat sealer is set to the following conditions:

Upper platen temperature: 93° C.;
Lower platen temperature: 55° C.;
Pressure: 21.6 N/cm$^2$ (on the sample); and
Time: 60 seconds.

B. Double-Sided Multi-Layer Adhesive Film

For a multi-layer adhesive film that includes a tacky adhesive composition on both major exterior surfaces of the heat curable adhesive film, the samples are prepared as set forth above for a single-sided tacky multi-layer adhesive film with the exception that, because both sides of the multi-layer adhesive film are tacky, the nylon fabric contacts a tacky side of the multi-layer adhesive film, as opposed to a non-tacky side of the multi-layer adhesive film.

Loop Tack Test Method

Loop tack is determined, using an Instron tester model 5500R (Instron Corporation, Norwood, Mass.), according to the ASTM D 6195-03 test method entitled "Standard Test Methods for Loop Tack" to measure the force to separate the adhesive from a 316 stainless steel plate (i.e., debonding strength) in grams force (gf). The method involves the use of loops prepared from 5 in (127 mm) specimen strips. The maximum bonding load results are reported in gram-force per 25 millimeters (gf/25 mm).

Samples for use in the Loop Tack test method are prepared by cutting a piece of a multi-layer adhesive film into 1 in×5 in (25.4 mm×127 mm) specimen strips in the machine direction. The strips are then conditioned at 23° C.+/−1° C. and a relative humidity of 50%+/−2% for 24 hours.

EXAMPLES

The following heat curable adhesive film and tacky adhesive compositions, all of which are commercially available from HB Fuller Company (St. Paul, Minn.), were used in the Examples:

EM 9002-100 is a heat curable polyurethane-based adhesive film having a film thickness of 100 microns and including solid surface-deactivated isocyanate, which is commercially available from HB Fuller Company.

WD4007 is a water-based polyurethane dispersion that is derived from polyether polyol and isophorone isocyanate and that forms a tacky adhesive when dry.

WD4051 is a water-based polyurethane dispersion that is derived from polyether polyol and isophorone isocyanate and that forms a tacky adhesive when dry.

ACRYLTAC SP405 is a water-based acrylic copolymer dispersion that forms a tacky adhesive when dry.

NP 6231 is a moisture curable polyurethane that forms a tacky adhesive when cured.

Control 1

Control 1 was an EM 9002-100 heat curable adhesive film. A 25.4 mm×127 mm piece of the heat curable adhesive film of Control 1 was prepared according to the sample preparation method set forth in the Loop Tack Test Method. The test specimen was then tested according to the Loop Tack Test Method. The results are set forth in Table 1.

Examples 1-5

The multi-layer adhesive films of Examples 1-5 were prepared by applying a water-based tacky adhesive composition identified in Table 1 onto a first major surface of the EM 9002-100 heat curable adhesive film using a 1/8VAU-316SS automatic spray gun equipped with a VA67255-60-316SS air cap and a VF2050-316SS fluid tip (Spraying Systems Co., Wheaton, Ill.) at room temperature as discrete beads and at the coat weight set forth in Table 1. The following spray conditions were adopted: 25 psi (17.2 N/cm$^2$) atomizing air pressure, 20 psi (13.8 N/cm$^2$) fan air pressure, and a spray distance of from 8 in (203.2 mm) to 18 in (457 mm). The coated film was then placed in a dryer at about 40° C. for about 2 minutes to evaporate water from the water-based tacky adhesive to form a multi-layer adhesive film with one-sided tacky adhesive. After drying, the multi-layer adhesive film was kept at room temperature for at least about 48 hours.

A test specimen was prepared according to the sample preparation method set forth in the Loop Tack Test Method using each multi-layer adhesive film set forth in Table 1.

Each test specimen was then tested according to the Loop Tack Test Method. The results are set forth in Table 1.

Examples 6 and 7

The multi-layer adhesive films of Examples 6 and 7 were prepared by applying a tacky adhesive composition identified in Table 1, using a 0.018 inch (457 microns) Nordson CF nozzle, onto a first major surface of the heat-curable adhesive film in controlled or randomized patterns as indicated in Table 1. Upon cooling a multi-layer adhesive film with one sided tacky adhesive is formed. The multi-layer adhesive film was kept at room temperature for at least about 48 hours, and then tested according to the Loop Tack Test Method. The results are set forth in Table 1.

Example 8

The multi-layer adhesive films of Example 8 was prepared by applying round dots of a water-based tacky adhesive composition identified in Table 1 onto a first major surface of the EM 9002 heat curable adhesive film using a rotary screen equipped with 1 mm in diameter holes covering 30% of the total area of the cylinder, in a control pattern and at the coat weight as indicated in Table 1.

TABLE 1

| Sample | Tacky Adhesive Type | Tacky Adhesive Coat weight (g/m²) | Pattern: Controlled (C) or Randomized (R) | Loop Tack Debonding Force (gf/25 mm) |
|---|---|---|---|---|
| Control 1 | None | 0 | N/A | 0 |
| Ex. 1 | WD4007 | 2 | R | 23.5 |
| Ex. 2 | WD4051 | 2 | R | 12.5 |
| Ex. 3 | WD4051 | 7 | R | 98.7 |
| Ex. 4 | ACRYLTAC SP405 | 2 | R | 76.3 |
| Ex. 5 | ACRYLTAC SP405 | 8 | R | 109.4 |
| Ex. 6 | NP6231 | 4 | C | 32 |
| Ex. 7 | NP6231 | 10 | C | 328 |
| Ex. 8 | ADHESIVE 2141 | 10 | C | 76 |

N/A = not applicable

Control 2

Control 2 was an EM 9002-100 heat curable adhesive film. A test specimen was prepared using a 1 in×8 in (25.4 mm×203.2 mm) piece of the heat curable adhesive film of Control 2 according to the Uncured 180 Degree Peel Strength Test Method Sample Preparation Method. The test specimen was then tested according to the Uncured 180 Degree Peel Strength Test Method. The results are set forth in Table 2.

Examples 9-14

Each of the multi-layer adhesive films of Examples 9-14 was prepared by applying the water-based adhesive identified in Table 3 onto a first major surface of an EM 9002-100 heat curable adhesive film (using the same spray equipment used in Examples 1-8) at room temperature as discrete beads and at the coat weight set forth in Table 2. The coated film was then placed in a dryer at about 40° C. for about 2 minutes to evaporate water from the water-based adhesive to form a multi-layer adhesive film with one-sided tacky adhesive. After drying, the multi-layer adhesive film was kept at a room temperature for at least about 48 hours.

Test specimens were prepared according to the Uncured 180 Degree Peel Strength Test Method Sample Preparation Method using each multi-layer adhesive film set forth in Table 2. The test specimens were then tested according to the Uncured 180 Degree Peel Strength Test Method. The results are set forth in Table 2.

TABLE 2

| Sample | Tacky Adhesive Type | Tacky Adhesive Coat weight (g/m²) | Uncured 180 Degree Peel Strength (N/25 mm) | Standard Deviation |
|---|---|---|---|---|
| Control 2 | None | 0 | 0 | 0 |
| Example 9 | WD4051 | 2 | 0 | 0 |
| Example 10 | WD4051 | 7 | 0.31 | 0.09 |
| Example 11 | WD4007 | 2 | 0 | 0 |
| Example 12 | ACRYLTAC SP405 | 2 | 0 | 0 |
| Example 13 | ACRYLTAC SP405 | 8 | 0 | 0 |
| Example 14 | ADHESIVE 2141 | 10 | 0 | 0 |

Control 3

Control 3 was an EM 9002-100 heat curable adhesive film. A test specimen was prepared using a 1 in×3.5 in (25.4 mm×88.9 mm) piece of the heat curable adhesive film of Control 3 according to the sample preparation method set forth in the Cured 180 Degree Peel Strength Test Method. The test specimen was then tested according to the Cured 180 Degree Peel Strength Test Method. The results are set forth in Table 3.

Examples 15-20

Each of the multi-layer adhesive films of Examples 15-20 was prepared by applying a water-based adhesive identified in Table 2 onto a first major surface of an EM 9002-100 heat curable adhesive film (using the same spray equipment as used in Examples 1-6) at room temperature as discrete beads and at the coat weight set forth in Table 3. The coated film was then placed in a dryer at about 40° C. for about 2 minutes to evaporate water from the water-based adhesive to form the multi-layer adhesive film with one-sided tacky adhesive. After drying, the multi-layer adhesive film was kept at room temperature for at least about 48 hours.

A test specimen was prepared according to the sample preparation method set forth in the Cured 180 Degree Peel Strength Test Method using each multi-layer adhesive film set forth in Table 3. The test specimen was then tested according to the Cured 180 Degree Peel Strength Test Method. The results are set forth in Table 3.

TABLE 3

| Sample | Tacky Adhesive Type | Tacky Adhesive Coat weight (g/m²) | Cured 180 Degree Peel Strength (N/25 mm) | Standard Deviation | % of the Cured Peel Strength Exhibited by Control 3 |
|---|---|---|---|---|---|
| Control 3 | None | 0 | 61.17 | 1.52 | 100 |
| Example 15 | WD4051 | 2 | 77.15 | 13.32 | 126 |
| Example 16 | WD4051 | 7 | 76.05 | 22.15 | 124 |
| Example 17 | WD4007 | 2 | 65.21 | 25.52 | 107 |
| Example 18 | ACRYLTAC SP405 | 2 | 66.42 | 3.99 | 109 |
| Example 19 | ACRYLTAC SP405 | 8 | 46.92 | 7.58 | 77 |
| Example 20 | ADHESIVE 2141 | 10 | 90.7 | 7.07 | 148 |

Other embodiments are within the claims. All publications cited herein are incorporated herein in their entirety.

We claim:

1. A multi-layer adhesive film comprising:
a heat curable adhesive film having a first major surface and a second major surface opposite the first major surface, and
a first tacky adhesive composition disposed on the first major surface of the heat curable adhesive film, the first tacky adhesive composition being tacky at room temperature,
the heat curable adhesive film comprising a surface-deactivated solid isocyanate and a polyurethane reactive with isocyanate functionality.

2. The multi-layer adhesive film of claim 1, wherein the heat curable adhesive film is a self-supporting adhesive film.

3. The multi-layer adhesive film of claim 1, wherein the multi-layer adhesive film exhibits a cured 180 degree peel strength that is at least 50% of the cured 180 degree peel strength exhibited by the heat curable adhesive film in the absence of the first tacky adhesive composition.

4. The multi-layer adhesive film of claim 1, wherein the first tacky adhesive composition comprises polyurethane, polyacrylate, or a combination thereof.

5. The multi-layer adhesive film of claim 1, wherein the multi-layer adhesive film further comprises a release liner in direct contact with the second major surface of the heat curable adhesive film.

6. The multi-layer adhesive film of claim 1 further comprising a second tacky adhesive composition disposed on the second major surface of the heat curable adhesive film.

7. The multi-layer adhesive film of claim 1, wherein the heat curable adhesive film has a thickness of from about 10 microns to about 200 microns.

8. The multi-layer adhesive film of claim 1, wherein the first tacky adhesive composition is in the form of a discontinuous coating.

9. The multi-layer adhesive film of claim 1, wherein the multi-layer adhesive film exhibits a loop tack of at least 10 gram-force per 25 millimeter at room temperature.

10. The multi-layer adhesive film of claim 1, wherein the multi-layer adhesive film exhibits a cured 180 degree peel strength of at least about 20 N/25 mm.

11. The multi-layer adhesive film of claim 1, wherein the first tacky adhesive is present on the heat curable adhesive film at a coat weight of from about 2 g/m$^2$ to about 12 g/m$^2$.

12. A method of making an article having a first substrate, the method comprising:
contacting the first substrate with the first tacky adhesive composition of the multi-layer adhesive film of claim 1; and
heating the multi-layer adhesive film to a temperature sufficient to activate the cure of the multi-layer adhesive film.

13. A method of making an article having a first substrate and a second substrate, the method comprising:
contacting the first substrate with the first tacky adhesive composition of the multi-layer adhesive film of claim 1;
heating the multi-layer adhesive film to a first temperature sufficient to render the heat curable adhesive film of the multi-layer adhesive film tacky; and
contacting a second substrate with the heat curable adhesive film of the multi-layer adhesive film.

14. The method of claim 13, further comprising heating the multi-layer adhesive film to a second temperature sufficient to activate the cure of the multi-layer adhesive film, wherein the second temperature is higher than the first temperature.

15. The method of claim 14, wherein the second temperature is at least about 60° C.

16. An article comprising:
the multi-layer adhesive film of claim 1, and
a first substrate in direct contact with the tacky adhesive composition of the multi-layer adhesive film.

17. The article of claim 16, further comprising a second substrate in direct contact with the heat curable adhesive film of the multi-layer adhesive film.

18. An article comprising:
the multi-layer adhesive film of claim 4, and
a first substrate in direct contact with the tacky adhesive composition of the multi-layer adhesive film.

19. The article of claim 17, wherein the first substrate is a flexible substrate and is selected from the group consisting of fabric, film, foil, paper, and combinations thereof.

20. The article of claim 17, wherein the second substrate is a rigid substrate and is selected from the group consisting of metal, metal composite, plastic, plastic composite, wood, wood-composite, glass, and combinations thereof.

* * * * *